United States Patent [19]
Darsey

[11] Patent Number: 5,261,023
[45] Date of Patent: Nov. 9, 1993

[54] STABLE PACKAGE OF ELONGATED OPTICAL FIBER STRAND MATERIAL

[75] Inventor: Ralph J. Darsey, Lawrenceville, Ga.

[73] Assignee: AT&T Bell Laboratories, Murray Hill, N.J.

[21] Appl. No.: 906,979

[22] Filed: Jun. 30, 1992

[51] Int. Cl.$^5$ ................................................. G02B 6/10
[52] U.S. Cl. ..................................... 385/134; 427/245
[58] Field of Search ............... 385/103, 106, 134, 128; 427/245; 264/41, 129

[56] References Cited

U.S. PATENT DOCUMENTS

| | | | |
|---|---|---|---|
| 4,113,349 | 9/1978 | Stiles | 385/106 |
| 4,230,463 | 10/1980 | Henis et al. | 427/245 X |
| 4,239,335 | 12/1980 | Stiles | 385/106 |
| 4,950,049 | 8/1990 | Darsey et al. | 385/134 X |

*Primary Examiner*—Akm E. Ullah
*Attorney, Agent, or Firm*—Donald E. Hayes, Jr.

[57] ABSTRACT

An optical fiber package of this invention applies a friction enhancing material to the smooth surface of a bobbin or mandrel onto which the optical fiber is wound. The friction enhancing material adheres the initial layer of fiber to the smooth surface of the bobbin, thereby eliminating the need for an independent base structure for establishing and maintaining a winding path for the fiber. Furthermore, the friction enhancing material prevents the lateral movement at initial layer of fiber relative to the bobbin. In accordance with the present invention, the friction enhancing material is preferably a plastic material such as room temperature vulcanized (RTV) silicones and Styrene Butadiene Rubber (SBR) or the like. In addition, the optical fiber package of this invention may combine the use of both a friction enhancing material between the initial fiber layer and the bobbin, as well as an adhesive material coating applied along the length of the optical fiber. Accordingly, a stable package of elongated optical fiber strand material is established which may be used in situations or environments requiring rapid payout of the fiber without adversely effecting either the physical or the communicational properties of the fiber.

9 Claims, 4 Drawing Sheets

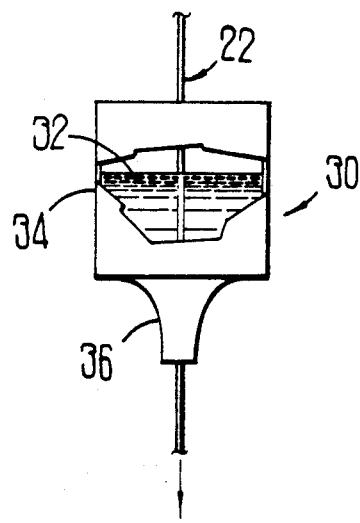
FIG 3
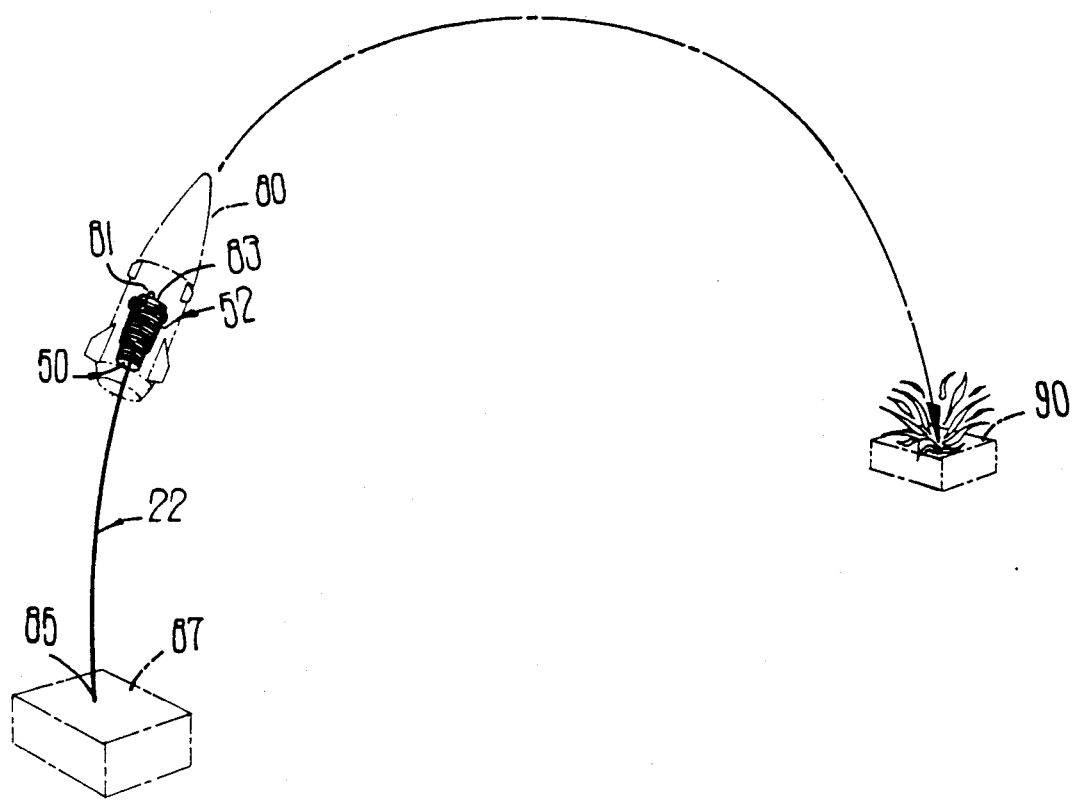
FIG A3

STABLE PACKAGE OF ELONGATED OPTICAL FIBER STRAND MATERIAL

TECHNICAL FIELD

This invention relates to a stable package of elongated strand material. More particularly, it relates to a stable optical fiber package comprising a plurality of convolutions wherein the initial layer of fiber is secured to the barrel of the bobbin supporting the package by a friction-enhancing material.

BACKGROUND OF THE INVENTION

Optical fiber has become a widely accepted form of transmission media. The use of optical communications involving the use of optical fibers has grown at an unprecedented pace. A continuous length of the fiber is drawn from an optical preform which may be made by any one of several known processes. Afterwards, or as part of a tandem process, the drawn fiber is coated, cured, measured and taken up, desirably in an automatic takeup apparatus, on a spool. Methods and apparatus for taking up optical fiber are disclosed and claimed in U.S. Pat. No. 4,798,346 which issued on Jan. 17, 1989 in the names of D. L. Myers and J. W. Wright. Typically, an optical fiber has a diameter on the order of 125 microns, and is covered with a coating material which increases the outer diameter of the coated fiber to about 250 microns, for example.

The spool on which the optical fiber is taken up has other uses. It is used to store the optical fiber, to pay out and to take up the fiber for other operations such as ribboning, cabling, and rewinding and is used to ship optical fiber which is wound thereon to other companies which further process the fiber. Also, it may be used in weapons and communications systems in which it may be attached to a control station.

Weapons and communications systems which use an optical fiber for two-way data communication between two or more moving bodies or between a moving body and a guidance station have been developed or are under development. Such uses include communication lines between aircraft, between an aircraft and a ship, and between a projectile, such as a missile, and a control station at a launch site, for example. Advantageously, the use of optical fiber for these kinds of communication precludes electromagnetic interference and undesired interception.

There are, however, certain disadvantages, not present in other forms of communication in using optical fiber. Optical fiber is less robust than metallic conductors, rendering it subject to breakage. Aside from breakage, optical fiber communication performance may be degraded by microbends in the fiber which are generated by bending or by other stresses to which the fiber is subjected. Such damage to an optical fiber not only reduces the long-term durability of the fiber, but also causes losses in the strength and in the content of the optical signal.

A typical optical fiber application in a weapons systems involves the packaging of a continuous length of optical fiber on a carrier bobbin which is positioned inside a vehicle. Such a vehicle commonly is referred to as a tethered vehicle. One end of the fiber is attached to operational devices in the vehicle, whereas the other end of the fiber is connected to a control or communications station at the launch site. During and after launch, two-way communication with the vehicle is conducted.

In order to use such an arrangement, there must be provided a reliable and compact package of the optical fiber which may be disposed within the vehicle and which will permit reliable deployment of the optical fiber during the flight of the vehicle. The use of metallic conductors for guidance or control of launched vehicles is known. See, for example, U.S. Pat. Nos. 3,114,456, 3,156,185 and 3,319,781. As mentioned hereinabove, the characteristics of optical fiber present difficulties not involved in the use of metallic conductors for communication. Specialized treatment is required to facilitate the unwinding of the optical fiber from its carrier bobbin at a relatively high rate of speed.

One problem is that the introduction of optical fiber for use in more hostile environments, such as in underwater cable or in military applications, has required that more stringent requirements be imposed on the physical properties of the fiber. Additionally, extremely long lengths of fiber may be required and may be obtained by splicing a plurality of lengths which are obtained using current manufacturing techniques. For these and other applications, splicing, in which the coating material is removed from end portions of two fibers which are then fused together end to end, provides a suitable means for joining the ends of two glass fibers with an acceptable loss.

Bared spliced fiber end portions must be recoated, maintaining stringent requirements on dimensional and strength parameters associated with the coated fiber. Typically, the recoating material contacts the adjacent originally coated portions of the spliced fibers along substantially radial planes exposed when the original coating material was removed from the end portions and along overlapping portions of the outer surface of the original coating material adjacent to the radial planes. The coating material is then cured to yield a recoated splice section with a transverse cross section which is larger than that of the optical fiber having the original coating material thereon.

In a typical tethered vehicle, an optical fiber which is wound on a payoff device and connected to a guidance system is payed off as the vehicle is moved. For tethered vehicles, the winding of the optical fiber on the payoff device must be accomplished in a precision manner. Otherwise, payoff could be disrupted. It has been found that if the cross section of the recoated spliced portion transverse of the longitudinal axis of the optical fiber is not the same as that of the optical fiber as originally coated, the winding pattern on the payoff device in all likelihood is not uniform. This will cause problems in fiber payoff following the launch of the tethered vehicle. This problem has been solved. A recoated splice having the same transverse cross section as that of the unspliced fiber has been attained by the use of methods and apparatus disclosed in U.S. Pat. No. 4,865,411 which issued on Sept. 12, 1989, in the names of R. J. Darsey, et al.

Another problem in the optical fiber guidance of tethered vehicles relates to the successful unwinding of the fiber from a carrier bobbin as the bobbin is propelled along with the vehicle. The leading end of the optical fiber is connected to a guidance system for controlling the path of travel of the vehicle. It becomes important for the optical fiber to be payed off from the bobbin without the occurrence of snags, otherwise the fiber may break and the control system rendered inoperable.

Contributing to the successful payout of the optical fiber is a precision wound package. Further, not only must the convolutions be wound with precision, they also must remain in place as wound during handling and when deployed. In other words, the optical fiber package must be a highly stable one. On the other hand, payout must occur easily without the necessity of high pulling forces to remove each convolution of fiber from the carrier bobbin.

In optical fiber packages for use in tethered vehicles, multiple layers of optical fiber are wound on a base layer of wire. An adhesive material between each of the individual optical fiber turns functions to hold the package together, forming a stable structure which is resistant to environmental extremes, shock and vibration. Desirably, the adhesive material which is used to hold together the convolutions must have a minimal impact on the optical performance of the wound optical fiber, and yet it must allow the optical fiber to be payed out with a controlled force at the peel-off point as the outermost turn is unwound at high speed. See commonly assigned U.S. Pat. No. 4,950,049. These requirements present somewhat conflicting requirements for the adhesive system.

What is needed and seemingly not present in existing prior art is a reliable and inexpensive manner to hold and secure the initial base layer of optical fiber which is positioned adjacent to the barrel surface of the bobbin or mandrel onto which the optical fiber is wound. The means securing the base layer of fiber to the bobbin needs to prevent all lateral movement of the fiber. If lateral movement of the initial layer of fiber occurs, a disruption of the desired winding configuration is likely to develop and lead to payout dispenser failure.

Generally, existing systems use an independent base structure to establish the proper winding path for the optical fiber to follow during winding. The base structure most commonly used is a precision stainless steel wire, or other cylindrical material, wound precisely onto the bobbin surface. The optical fiber is then wound into the grooves formed by the additional wire winding. When this technique is used, the wrap of cylindrical material remains around the bobbin and becomes part of the optical fiber package.

An alternative method of providing grooves involves coating the bobbin surface with a potting material then forming grooves by indenting the surface with cylindrical forming device such as plastic monofilament or wire. The cylindrical forming device may then be removed thereby leaving "tracks" within the potting material for the fiber to follow as it is wound onto the bobbin. Another alternate, but expensive, method is to actually groove the bobbin surface itself with extremely precise machining or molding procedures. However, in each of the prior art alternatives mentioned above, the size ratio of the fiber being wound and the grooving in the base layer structure must be closely matched to control the desired package configuration.

With the invention of a fiber having a preapplied adhesive, as described in commonly assigned U.S. Pat. No. 4,950,049, the problems associated with each of the individual optical fiber turns moving relative to each other have been addressed and overcome. However, the need to reliably control slippage or lateral movement of the initial wrap of fiber onto the bobbin or mandrel still remains. The existing techniques described above are expensive and cumbersome.

What still is needed are more reliable, stable package of elongated optical fiber strand material. Specifically, the sought-after method and apparatus should provide a more manufacturable bobbin of precision wound optical fiber in which the bobbin or mandrel and the internal layer of fiber are held together by a friction-enhancing material. The friction-enhancing material should be such that it stabilizes the package yet permits payout at relatively high speeds. Further, the process should be easily repeatable from one bobbin to another.

SUMMARY OF THE INVENTION

The foregoing problems of the prior art have been solved by the methods and apparatus of this invention. An optical fiber package of this invention applies a friction-enhancing material to the smooth surface of a bobbin or mandrel onto which the optical fiber is wound. The friction-enhancing material adheres the initial layer of fiber to the smooth surface of the bobbin, thereby eliminating the need for an independent base structure for establishing and maintaining a winding path for the fiber. Furthermore, the friction-enhancing material prevents the lateral movement at initial layer of fiber relative to the bobbin.

In accordance with the preset invention, the friction-enhancing material is preferably a plastic material such as room temperature vulcanized (RTV) silicones and Styrene Butadiene Rubber (SBR) or the like. In addition, the optical fiber package of this invention may combine the use of both a friction-enhancing material between the initial fiber layer and the bobbin, as well as an adhesive material coating applied along the length of the optical fiber. Accordingly, a stable package of elongated optical fiber strand material is established which may be used in situations or environments requiring rapid payout of the fiber without adversely effecting either the physical or the communicational properties of the fiber.

BRIEF DESCRIPTION OF THE DRAWING

Other features of the present invention will be more readily understood from the following detailed description of specific embodiments thereof when read in conjunction with the accompanying drawings, in which:

FIG. 3 is a schematic view of a portion of the line of FIG. 1;

FIG. 13 is a schematic view which shows a use of the stable package of this invention.

DETAILED DESCRIPTION

Figure 1:
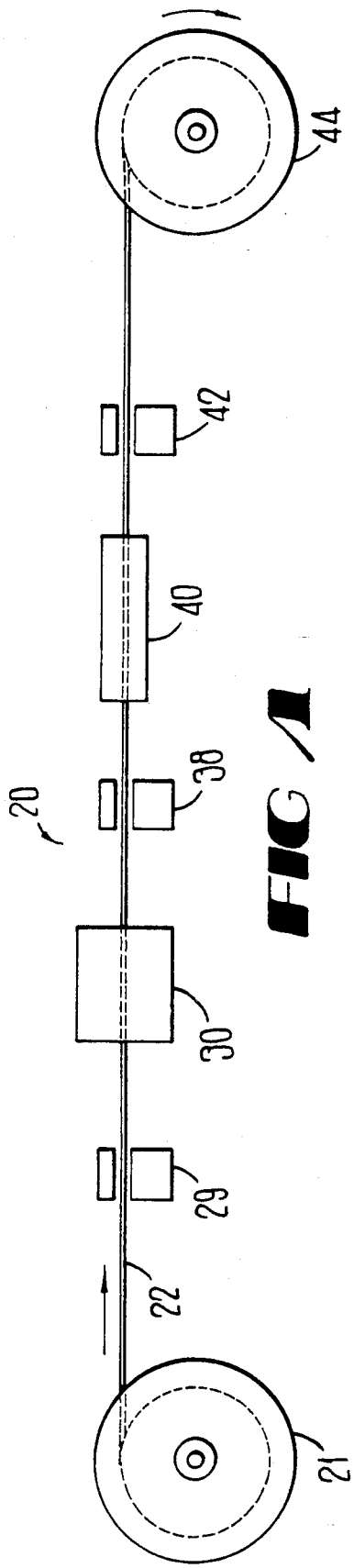
FIG. 1 is a schematic view of a manufacturing line which is used to apply an adhesive material to optical fiber in accordance with the methods of this invention.
Figure 2:
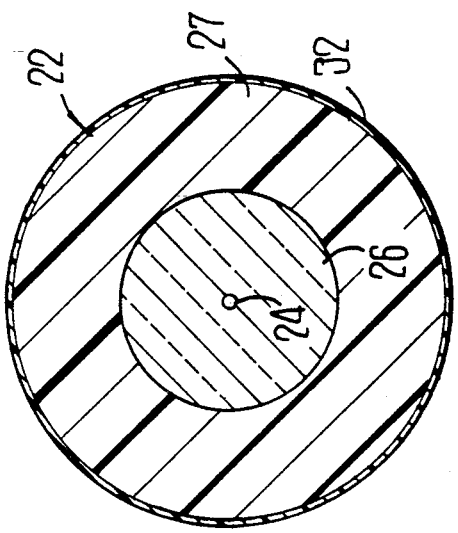
FIG. 2 is a cross sectional end view of an optical fiber which is provided with a coating and with a layer of an adhesive material.

Referring now to FIG. 1, there is shown schematically a manufacturing line which in part is used to provide an adhesive-coated elongated strand material such as optical fiber, for example. The adhesive-coated optical fiber is used to provide a stable, precision wound package of optical fiber. The line is designated generally by the numeral 20 and includes a spool 21 of coated optical fiber 22 (see FIG. 2). As can be seen in FIG. 2, the optical fiber 22 includes a core 24, a cladding 26 and a coating 27. Instead of a single coating layer 27, dual layers may be used, as is well known in the art. Typically, the outer diameter of the coated optical fiber 22 is 250 μm. Hereinafter, the term optical fiber is used and is intended to designate the optical fiber with it single or dual protective coatings thereon.

As is seen in FIG. 1, the optical fiber 22 is payed out from the supply spool 21 and is advanced along a path of travel which in a preferred embodiment shown in FIG. 3 is oriented vertically and through a diameter measuring gauge 29. The diameter measuring gauge 29 is available commercially such as one designated Lasermike ® micrometer and available from the Techmet Company.

Afterwards, the coated optical fiber is advanced through an applicator which is designated generally by the number 30. The applicator 30 functions to apply an adhesive material 32 to the coated optical fiber. In a final package of wound optical fiber, it is the adhesive material which holds the convolutions together before the optical fiber is payed out.

The applicator 30 includes an application cup 34 (see FIG. 3) which holds a bath of the adhesive material 32 in liquid form. After each successive increment of length of the optical fiber is moved through the bath, it is moved through a sizing die 36. The sizing die 36 may be a rigid die, or it may be a flexible tip. The die is sized to cause the optical fiber having the adhesive material 32 applied thereto in a layer as it emerges from the applicator 30. If it is a flexible tip, the inner diameter of the tip may be changed by a collet or an iris type arrangement similar to one described in U.S. Pat. No. 4,370,355 which issued on Jan. 25, 1983 to P. J. Niesse and which is incorporated by reference hereinto.

In the preferred embodiment of the present invention, a friction-enhancing material is applied to the surface of the carrier bobbin to ensure that the initial layer of fiber is adequately held in its desired position relative to carrier bobbin. Such use of the friction-enhancing material alleviates the need for the base layer of wire. Therefore, if used in combination, the adhesive material will act to maintain the desired relative configuration and orientation between adjacent optical fibers, while the friction-enhancing material will provide the critical securing force between the initial layer of fiber being wound and the surface of the carrier bobbin or spool.

Any number of friction-enhancing and adhesive materials may be applied to the optical fiber to provide the stable package. For example, a thermoplastic material, either amorphous or semi-crystalline, a hot melt material, a thermosetting material, or a wax other materials that can form interfacial bonding by heat treatment or by time or solvent exposure may be used. In the preferred embodiment, the adhesive material is a polyvinyl butyral plastic material.

What is important is that the adhesive material must meet particular requirements. As stated in U.S. Pat. No. 4,950,049, the adhesive material should be capable of being applied to an optical fiber preferably in a liquid state and then caused to be tack-free when it is wound on a process spool. Also, it should be noted that the friction-enhancing material and/or the adhesive material may be capable of being treated subsequently to develop adhesive bonds between at least portions of adjacent convolutions of the optical fiber which are wound on a carrier bobbin. The bonding must be such not only that the resulting optical fiber package is stable, but also, it must allow the optical fiber convolutions to be payed off from a carrier spool without damage to the fiber.

In the preferred embodiment, as mentioned hereinabove, the adhesive material is a polyvinyl butyral. The bath in the applicator 30 comprises a mixture comprising polyvinyl butyral and a solvent. In the preferred embodiment, the solvent is methyl ethyl ketone.

Figure 4:
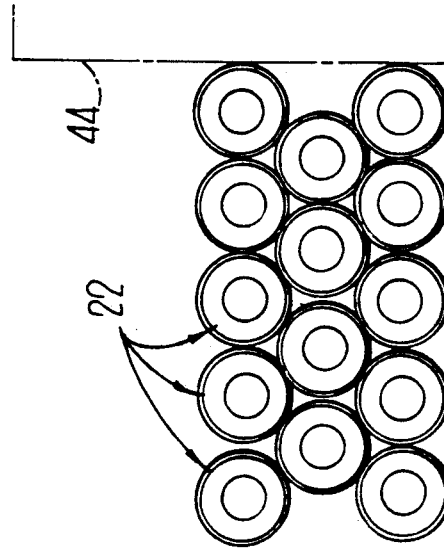
FIG. 4 is a cross sectional end view of a portion of a process spool having a plurality of convolutions wound loosely thereon.

After the drying and processing of the adhesive material on the optical fiber as described in commonly assigned U.S. Pat. No. 4,950,049 has been accomplished, the optical fiber is wound in a plurality of convolutions on a process spool 44. The winding on the process spool 44 is accomplished so that the optical fiber is somewhat loosely wound thereon (see FIG. 4). Typically, the tension on the optical fiber as it is wound loosely on the intermediate process spool 44 is about 30 to 40 grams.

Figure 5:
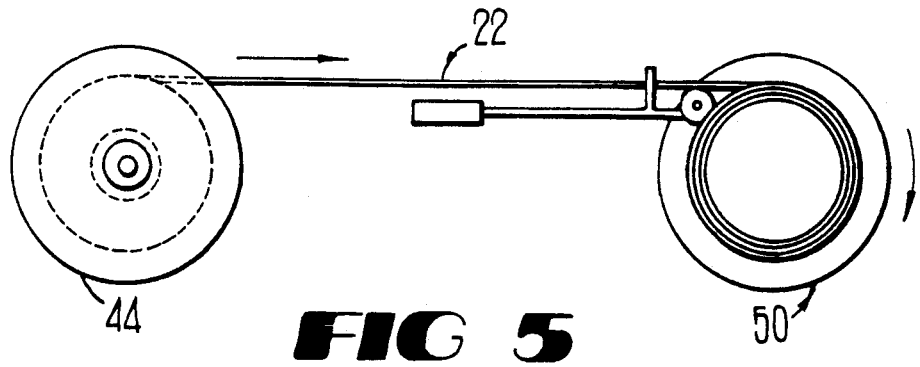
FIG. 5 is a schematic view of the transfer of optical fiber from loosely wound convolutions on the process spool to a precision tightly wound package on a carrier bobbin.
Figure 7:
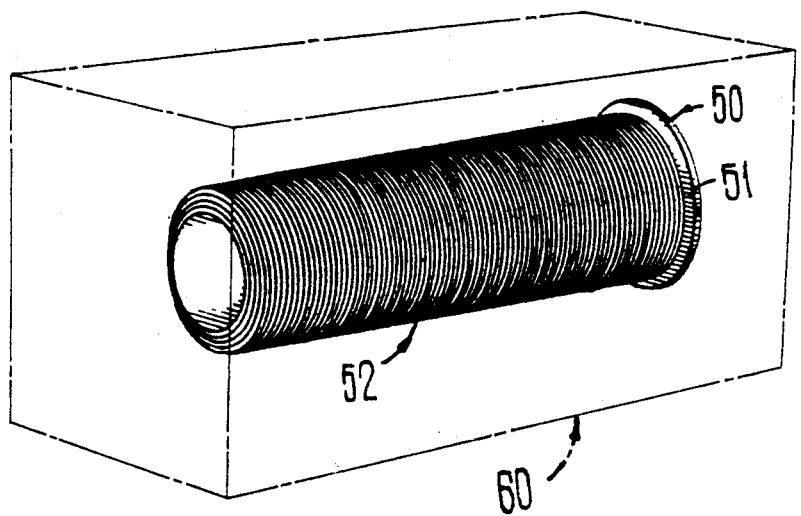
FIG. 7 is a schematic view of apparatus which is used to treat the adhesive material on convolutions of the optical fiber after the optical fiber has been wound on the carrier bobbin.
Figure 6:
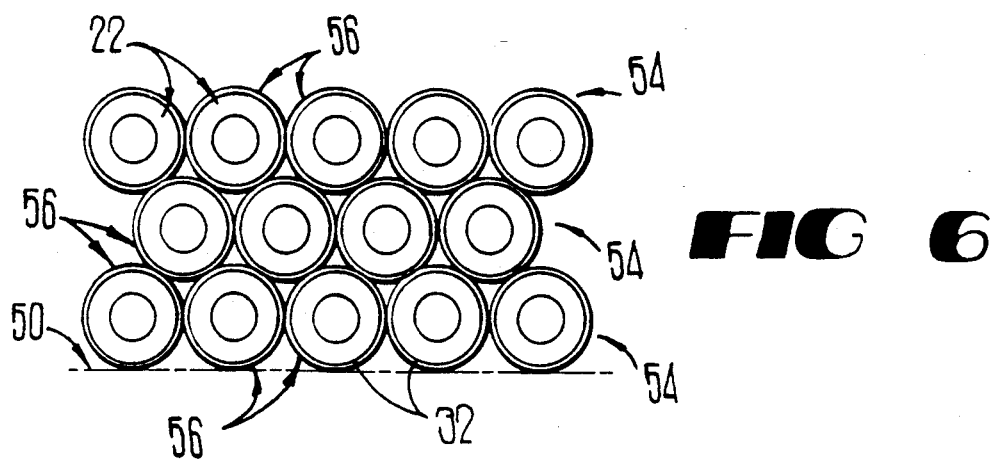
FIG. 6 is a view of a portion of an optical fiber package comprising convolutions of optical fiber wound on the carrier bobbin.

Then the spool 44 of loosely wound optical fiber and another spool which is designated a deployment or carrier bobbin and which is designated by the numeral 50 are arranged for a rewind operation (see FIG. 5). Generally, the bobbin 50 may be made of a metallic, plastic or a composite material and has a hub which is tapered slightly from a flange 51. During that operation, the optical fiber is rewound from a plurality of loosely wound convolutions to a precision wound package 52 comprising a plurality of layers 54—54 (see FIG. 6) each comprising a plurality of tightly wound convolutions 56—56. For this rewinding operation, the tension in the optical fiber is about 100 grams. The precision winding operation which may be carried out in a process such as is shown in U.S. Pat. No. 4,746,080, for example, is time consuming, being accomplished at a relatively low line speed.

In accordance with the preferred embodiment of the present invention, at least a portion of the surface of the spool or bobbin which is positioned immediately adjacent the initial layer of optical fiber wound is treated with the friction-enhancing material to prevent lateral movement of the initial fiber layer relative to the bobbin. Normally, optical fiber is wound onto a bobbin or mandrel having a tapered configuration by starting at the base or larger end of the bobbin barrel.

As stated earlier, existing optical fiber winding mandrel configurations require the inclusion of an intermediate grooved base layer between the smooth barrel surface of the mandrel and the initial layer of fiber being wound. The additional base structure acts to prevent lateral movement of the initial layer of fiber relative to the bobbin. To date, no alternative manner exists which allows the elimination of the expensive and cumbersome grooved base structure, short of customizing the bobbin surface. Absent any support for the initial layer when using a tapered bobbin, the fiber tends to slide along the smooth barrel surface toward the small end of the bobbin.

The present invention sets forth the use of the previously described preapplied adhesive coated fiber as set forth herein and in U.S. Pat. No. 4,950,049, in combination with a layer of compatible friction-enhancing material along the surface of the barrel of the bobbin, thereby providing a winding process which would not require the use of any type of grooved base structure to adequately establish the winding pattern for the optical fiber. In addition, the present invention totally eliminates the need for closely controlling the fiber winding ratio as previously required. Furthermore, the concept of the present invention enhances the use of the preapplied adhesive fiber since the creation of a tight package allows more contact between the adhesive surfaces.

The specific friction-enhancing material to be placed on the winding surface of the bobbin in accordance with the present invention is preferably a plastic material such as room temperature vulcanized (RTV) silicones and Styrene Butadiene Rubber (SBR) or the like. Styrene Butadiene Rubber is a product of Eclectic Products, Inc., Carson, Calif., and is presently sold industrially as E-6000 adhesive. Styrene Butadiene Rubber exhibits the desired pliability (Short A durometer 70-85) to provide a "track" for the fiber to follow, and sufficiently high surface friction to prevent lateral movement of the fiber pack. Specifically, the E-6000 adhesive has been found to provide a very stable bond to the surface of the bobbin, regardless of whether the bobbin is made of a metal or a polymeric composite material. However, it should be noted that any well known friction-enhancing material satisfying the desired criteria may be used in accordance with the present invention without changing the scope of the present invention.

It should be noted that while a preferred friction-enhancing material is directed above, a second embodiment of the present invention may include applying a treatable adhesive material such as is applied to the length of fiber, the smooth bobbin surface as well. Accordingly, now referring to FIG. 8, there is shown a curve 70 which depicts the modulus behavior of a thermoplastic material. At room temperature, or in the range of temperatures in which the optical fiber is used, i.e. less than about 70° C., the material is in a glassy zone which is designated generally by the numeral 72. At that time, it is non-tacky. Then, as the temperature increases, the modulus decreases, descends through a transition zone 74 and subsequently becomes rubbery along portions 76 and 78. The degree of tack depends on the length of time during which the thermoplastic material is exposed to elevated temperatures and the values of these temperatures. Bonding is enhanced by causing the composite material to be heated in the range shown for these portions 74, 76, or 78 of the graph, depending on the amount of bonding which is desired. For some materials, bonding in the transition zone may be sufficient.

Referring now to FIGS. 9-12, there are shown a sequence of views which depict the formation of modular bonds across an interface 80 between the adhesive material on the initial layer of fiber and that on the surface of the bobbin. For a thermoplastic material, molecular bonding occurs following the interpenetration or migration of chains of which the plastic material is comprised across interfacial boundaries between contiguous portions of the adhesive material.

Figure 10:
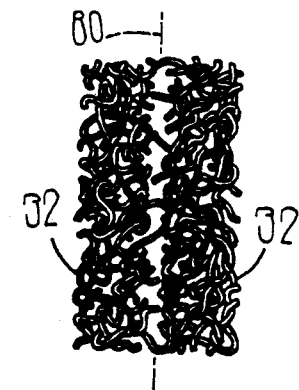
Figure 11:
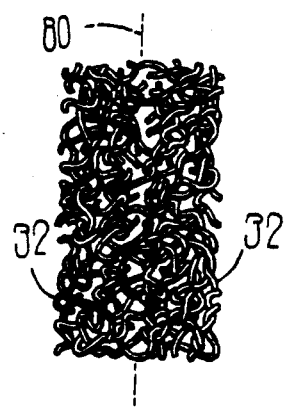
Figure 12:

The amount of bonding is related to the amount of chain penetration that occurs across the contiguous portions of the adhesive material. Also, the amount of bonding increases for increasing temperatures to which the adhesive material is exposed or to increasing time during which it is exposed at a given temperature. FIGS. 10-12 illustrate increased bonding as the temperature passes through the regions 74, 76 and 78. The required amount of bonding for a particular application will determine the time or temperature or both to which the optical fiber is exposed.

Figure 9:
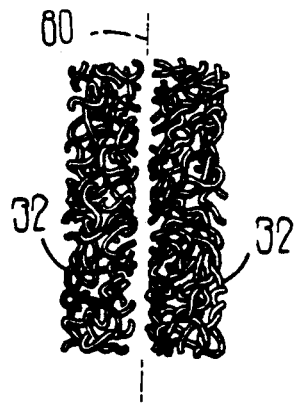
FIGS. 9-12 are a series of enlarged views which are schematic of the modulator level of an interface between adhesive material on contiguous convolutions of the optical fiber wound on a bobbin as the interface steps through transitional stages to a stage wherein there is an interfacial bond between adhesive material on portions of adjacent convolutions.

Because of the bonding or molecular migration, as it is often termed, across the interfaces as can be traced by comprising FIGS. 9-12, the convolutions of the optical fiber are held together, as well as securing the initial layer of fiber to the bobbin surface. As is seen in FIG. 9, portions of the adhesive material 32 are not bonded across the interface 80 prior to treatment in the apparatus 60. When subjected to the treating apparatus 60, the adhesive material on contiguous portions begin to develop molecular bonds (see FIG. 10). After exposure to a predetermined temperature for a predetermined time, sufficient molecular bonding across the interface 80 is established (see FIGS. 11-12) to hold together the convolutions. As a result, a stable package of wound fiber is provided. It may be handled with confidence so that the convolutions will remain in place. However, the bond is not so great as to impede payoff of the optical fiber from the bobbin. At the expected tension levels, each successive convolution separates from adjacent convolutions and when appropriate, the initial layer of fiber from the bobbin surface without any damage to the optical fiber occurring. It must be recognized that it is only at the contact points that molecular migration occurs to establish bridging chains across the interface.

What is important is that suitable adhesion can be caused to occur with any adhesive material for which molecular bonding can occur across an interface between contiguous portions of adjacent convolutions and between the initial layer of fiber and the barrel of the bobbin as a result of suitable treatment. Such materials include a thermosetting material, a hot melt adhesive material or a thermoplastic material, either amorphorous or semi-crystalline. During suitable treatment of any of these materials, molecular migration across the interfaces between contiguous portions occurs. Upon cooling, a molecular bond is established across that interface to hold the convolutions securely in place.

For polyvinyl butyral, the treating temperature range is about 70° C. to about 120° C. For other suitable materials, the treatment temperature range may be different, but is generally above 70° C. That time or temperature or that desired level of bonding will be based on the properties of the adhesive material used.

The treating temperature may be provided by a number of suitable apparatus. For example, the facility could include an oven or a microwave heating facility. Microwave energy may be caused to couple to the adhesive material to heat it. When microwave energy is used to increase the temperature of the adhesive material, the bobbin 50 is made of a non-metallic material. Furthermore, using a friction-enhancing material in accordance with the present invention, the need for a stainless steel wire base mixture is eliminated, thereby allowing the use of microwave energy to greatly reduce the associated processing time required. In another technique, a vacuum may be used to withdraw air from interstices between the convolutions. A vapor or liquid material is introduced to cause contacting portions of convolutions to stick together. Then vacuum is reapplied to remove the excess material.

By controlling the degree of tack between the convolutions on the precision wound bobbin 50, damage to the fiber during high speed unwinding is avoided. Of course, the tack time and temperature will depend on the particular adhesive material which is applied to the optical fiber.

Figure 8:
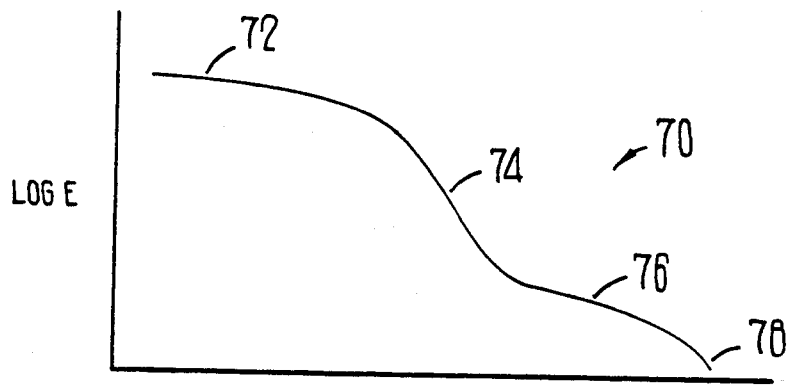
FIG. 8 is a graph which depicts the behavior of one parameter of a thermoplastic material as it is subjected to heat treatment.

For a thermoplastic material at the interface between adjacent convolutions, the transition of the thermoplastic material as shown in FIG. 8 is reversible. As the adhesive material cools, the region of bonding along contiguous portions of adjacent convolutions is immobilized or frozen in and is stable with time. When the optical fiber is cooled to ambient temperatures, the interfacial bonding is preserved at levels achieved during the higher temperature exposure. Those portions of the surfaces which are not bonded return to a glassy state, as can be seen from FIG. 8. The use of a glassy, adhesive material which is tack-free at room temperature facilitates high speed, uniform coating of optical fiber and the winding of convolutions thereof on a bobbin. The adhesion is generated and controlled by the tacking of the thermoplastic material in the transition and/or rubbery zones.

The return of those quadrants of the adhesive material on the optical fiber which are not contiguous to portions of adhesive material on adjacent convolutions to a glassy state upon cooling is beneficial. These surfaces are characterized by a relatively low coefficient of friction. These low coefficient of friction, glassy surfaces facilitate the high speed payout of the optical fiber. If the surfaces were not so characterized, payout, which involves portions of each convolution sliding over a portion of a surface of other convolutions, may cause some of the adjacent convolutions to become dislodged prematurely and cause package disruption. This undesired occurrence may become manifested in the payout of multiple convolutions which could lead to entanglements. Advantageously, the low coefficient of friction portions of the surfaces of the convolution which are not bonded molecularly avoids multiple payout with each convolution being pulled easily over surfaces of other convolutions.

The precision wound optical fiber package 52 may be used, for example, to control the flight path of a missile. In such an environment, a bobbin 50 with the optical fiber wound thereon is mounted in a missile 80 (see FIG. 13). An inner end 81 of the optical fiber is connected to devices 83 within the missile and a leading end 85 of the fiber is connected to a control station 87. Following the launching of the missile, the flight path may be controlled by the control station 87 which communicates with the missile 80 through the optical fiber 22. As the missile moves from the control station 87 to a target 90, the optical fiber is payed off from the unflanged end of the bobbin 50 to maintain communications between the control station and the missile.

It is to be understood that the above-described arrangements are simply illustrative of the invention. Other arrangements may be devised by those skilled in the art which will embody the principles of the invention and fall within the spirit and scope thereof.

I claim:

1. An optical fiber package, which comprises:
   a length of optical fiber which is disposed in a plurality of convolutions such that at least a portion of an innermost convolution is adjacent to at least a portion of a supporting bobbin; and
   a layer of friction enhancing material which adheres the innermost convolution of the length of optical fiber to the supporting bobbin and wherein the friction enhancing material is applied directly to a portion of the supporting bobbin.

2. The optical fiber package of claim 1 wherein the friction enhancing material is room temperature vulcanized (RTV) silicone.

3. The optical fiber package of claim 1 wherein the friction enhancing material is Styrene Butadiene Rubber (SBR).

4. The optical fiber package of claim 1, further comprising:
   a layer of an adhesive material which encloses increment of length of said optical fiber and which upon suitable treatment bonds molecularly across an interface between portions of the adhesive material, said adhesive material on contiguous portions of said optical fiber being adhered together by molecular bonds and on other portions of said optical fiber having an outer surface which is characterized by a relatively low coefficient of friction.

5. The optical fiber package of claim 4, wherein said adhesive material is selected from the group consisting of a thermoplastic material, a hot melt material, a thermosetting material, solder and a wax.

6. The optical fiber package of claim 5, wherein said adhesive material comprises a mixture of a polyvinyl butyral plastic material and a solvent.

7. A method of providing an optical fiber package, said method comprising the steps of:
   coating a portion of a supporting bobbin with a friction enhancing material;
   causing the length of optical fiber to be wound into a plurality of convolutions such that each convolution is in engagement with at least a portion of another convolution and such that an innermost layer of fiber is adhered to a portion of the supporting bobbin by the friction enhancing material.

8. The method of claim 7, wherein the friction enhancing material includes room temperature vulcanized (RTV) silicones.

9. The method of claim 7, wherein the friction enhancing material includes Styrene Butadiene Rubber (SBR).

* * * * *